(12) United States Patent
Park et al.

(10) Patent No.: US 8,516,036 B2
(45) Date of Patent: Aug. 20, 2013

(54) METHOD AND APPARATUS TO MANAGE FILES FOR A PORTABLE DEVICE

(75) Inventors: Jono-woo Park, Seoul (KR); Jin-ho Kang, Suwon-si (KR); Kyung-suk Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 713 days.

(21) Appl. No.: 11/657,081

(22) Filed: Jan. 24, 2007

(65) Prior Publication Data

US 2008/0010295 A1 Jan. 10, 2008

(30) Foreign Application Priority Data

Jun. 26, 2006 (KR) .................. 10-2006-0057630

(51) Int. Cl.
*G06F 17/30* (2006.01)
(52) U.S. Cl.
USPC ............................ 709/203; 711/165; 707/621
(58) Field of Classification Search
USPC ................. 707/104, 621; 709/223; 711/165
See application file for complete search history.

(56) References Cited

U.S. PATENT DOCUMENTS

| 7,113,454 | B2* | 9/2006 | Matsuoka | 369/30.04 |
|---|---|---|---|---|
| 2002/0045960 | A1 | 4/2002 | Phillips et al. | |
| 2004/0015401 | A1 | 1/2004 | Lee et al. | |
| 2004/0032800 | A1* | 2/2004 | Matsuoka | 369/30.18 |
| 2005/0091442 | A1* | 4/2005 | Kii et al. | 711/100 |
| 2005/0289200 | A1* | 12/2005 | Miyazawa | 707/205 |
| 2006/0031859 | A1* | 2/2006 | Matsuda et al. | 720/645 |
| 2006/0168351 | A1* | 7/2006 | Ng et al. | 709/248 |
| 2006/0190500 | A1* | 8/2006 | Rao et al. | 707/203 |
| 2006/0195480 | A1* | 8/2006 | Spiegelman et al. | 707/104.1 |
| 2006/0200599 | A1* | 9/2006 | Manchester et al. | 710/62 |
| 2006/0224620 | A1* | 10/2006 | Silverman et al. | 707/104.1 |
| 2006/0288036 | A1* | 12/2006 | Sadovsky et al. | 707/102 |
| 2007/0146790 | A1* | 6/2007 | Park | 358/1.16 |
| 2007/0180154 | A1* | 8/2007 | Cornwell et al. | 710/5 |
| 2008/0256378 | A1* | 10/2008 | Guillorit | 713/400 |

FOREIGN PATENT DOCUMENTS

| CN | 1554095 A | 12/2004 |
|---|---|---|
| GB | 2 380 378 | 4/2003 |
| JP | 2006-012359 A | 1/2006 |
| KR | 2005-52607 | 6/2005 |
| WO | WO 03/019560 | 3/2003 |
| WO | WO 2005/073856 | 8/2005 |

OTHER PUBLICATIONS

Sandisk, Sansa e100 User Guide, Jan. 2006.*
Newlaunches.com, SanDisk Sansa e100 Flash Based MP3 Players, May 12, 2005.*

(Continued)

*Primary Examiner* — Mahesh Dwivedi
(74) *Attorney, Agent, or Firm* — Jefferson IP Law, LLP

(57) ABSTRACT

A method and apparatus to manage files of a portable device such as an mp3 player, a mobile phone, or a game console, the method comprising copying files to be played from a source server and storing the files in a file system on a folder-by-folder basis; determining the presence of files which have been changed in the portable device by checking the file system when the files are completely copied; and creating a playlist of the files, folder-by-folder, according to file path information of the file system when there are the changed files.

22 Claims, 7 Drawing Sheets

(56) References Cited

OTHER PUBLICATIONS

Office Action to EP 07103042 from the European Patent Office, dated Jun. 12, 2010.*
Manual for product YH-J70, dated May 15, 2005.*
Review of product YH-J70, dated Dec. 20, 2005.*
Manual for the YP-K5, by Samsung, dated Aug. 4, 2006.*
Office Action issued by State Intellectual Property Office of China in Chinese Patent Application No. 2007100052909 n May 8, 2009.
Search Report issued on May 22, 2007 by the European Patent Office for European Patent Application No. 07103042.3.

* cited by examiner

| INDEX | FILE PATH | PHYSICAL MEMORY START ADDRESS | SIZE | FILE NAME | NEW /OLD |
|---|---|---|---|---|---|
| 1 | ROOT/MEDIA/UP-TO-DATE-SONG | 0 | 20 | 1.mp3 | new |
| 2 | ROOT/MEDIA/UP-TO-DATE-SONG | 20 | 20 | 2.mp3 | new |
| 3 | ROOT/MEDIA/UP-TO-DATE-SONG | 40 | 20 | 3.mp3 | new |
| ⋮ | ⋮ | ⋮ | ⋮ | ⋮ | ⋮ |

FIG. 6E

| INDEX | FILE NAME | PLAYLIST TITLE |
|---|---|---|
| 1 | 1.mp3 | UP-TO-DATE SONG |
| 2 | 2.mp3 | UP-TO-DATE SONG |
| 3 | 3.mp3 | UP-TO-DATE SONG |
| ⋮ | ⋮ | ⋮ |

METHOD AND APPARATUS TO MANAGE FILES FOR A PORTABLE DEVICE

CROSS-REFERENCE TO RELATED APPLICATION

This application claims the priority of Korean Patent Application No.-2006-57630, filed on Jun. 26, 2006, in the Korean Intellectual Property Office, the disclosure of which is incorporated herein in its entirety by reference.

BACKGROUND OF THE INVENTION

1. Field of the Invention

Aspects of the present invention relate to a file management system for a portable device, and more particularly, to a method and apparatus to manage a file that automatically creates a playlist in a portable device such as an mp3 player, a mobile phone or a game console.

2. Description of the Related Art

Generally, users need to view a playlist in order to use media in portable devices, such as mp3 players, mobile phones, or game consoles. In most portable devices, media that a user desires to play is managed using folders. However, since a file management method in portable devices utilizes a multimedia transfer protocol (MTP), the existing function of using folders is removed from the portable devices. Therefore, the conventional portable devices adopting the MTP need to additionally incorporate a playlist.

FIG. 1 is a flowchart of a method of creating a playlist in the conventional portable device. Referring to FIG. 1, the portable device is first connected to a personal computer (PC) (operation 110). Second, the Windows Media Player 10 program is opened in the PC (operation 120). Then, a playlist is created using the Windows Media Player 10 program (operation 130). FIG. 2A shows an example of creating a playlist using the Windows Media Player 10 program.

Next, the playlist created using the Windows Media Player 10 program is synchronized with media in the portable device (operation 140). FIG. 2B shows an example of synchronizing files in the playlist with the media in the portable device using the Windows Media Player 10 program. Finally the portable device is disconnected from the PC (operation 150).

As described above, when using the conventional portable device, users are inconvenienced in having to create a playlist using a specific program, such as the Windows Media Player 10 program.

SUMMARY OF THE INVENTION

Aspects of the present invention provide a method and apparatus to automatically create a playlist, folder-by-folder.

According to an aspect of the present invention, there is provided a method of managing files of a portable device, the method comprising: copying files to be played from a source server and storing the files in a file system on a folder-by-folder basis; determining the presence of files which have been changed in the portable device by checking the file system when the files are completely copied; and creating a playlist of the files, folder-by-folder, according to file path information of the file system when there are added files.

According to another aspect of the present invention, there is provided an apparatus to manage files of a portable device, the apparatus comprising: a memory unit to store file information and playlist information on a folder-by-folder basis; an interface port unit to interface with a source server; and a control unit to copy files to be played on a folder-by-folder basis from the source server connected by the interface port unit, to store the files in a file system of the memory unit, to determine whether files which have been changed in the portable device are present with reference to a section of the file system where the files are stored, to analyze path information of the changed files, and to register the path information in the memory unit as a playlist on a folder-by-folder basis.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6C illustrates directories after a user copies files folder-by-folder; and

FIGS. 6D and 6E illustrate a file table and a playlist table map, respectively.

DETAILED DESCRIPTION OF THE EMBODIMENTS

Figure 1:
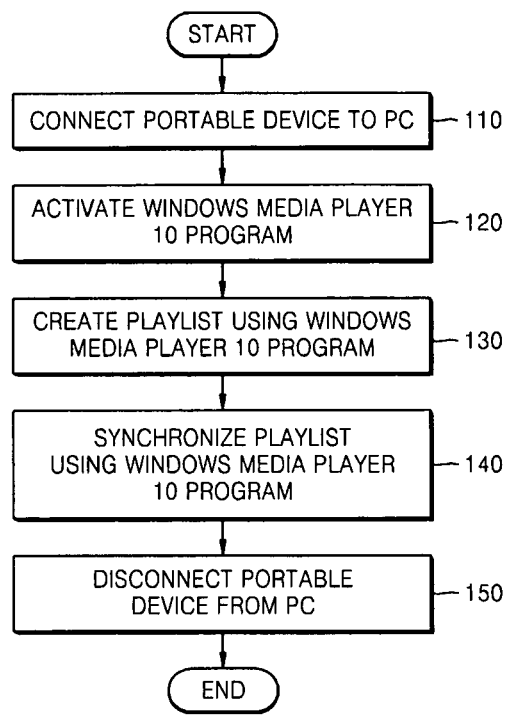
FIG. 1 is a flowchart of a method of creating files in the conventional portable device.
Figure 2A:
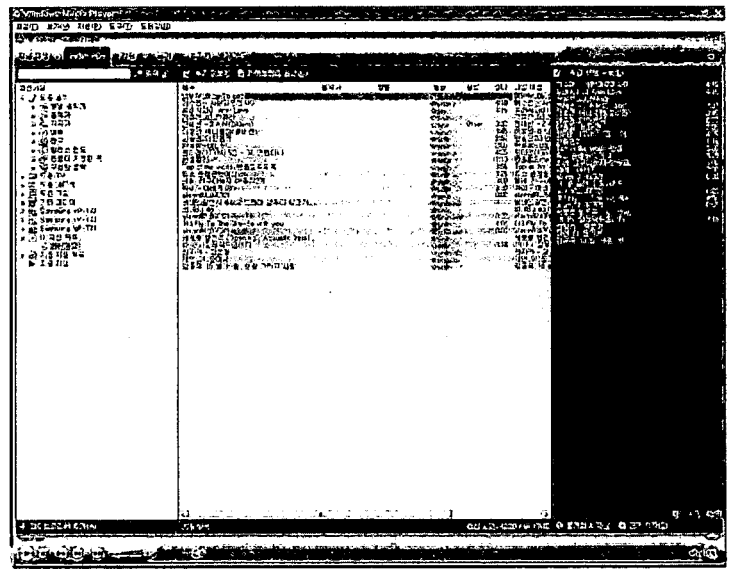
FIG. 2A shows an example of creating a playlist using the Windows Media Player 10 program.
Figure 2B:
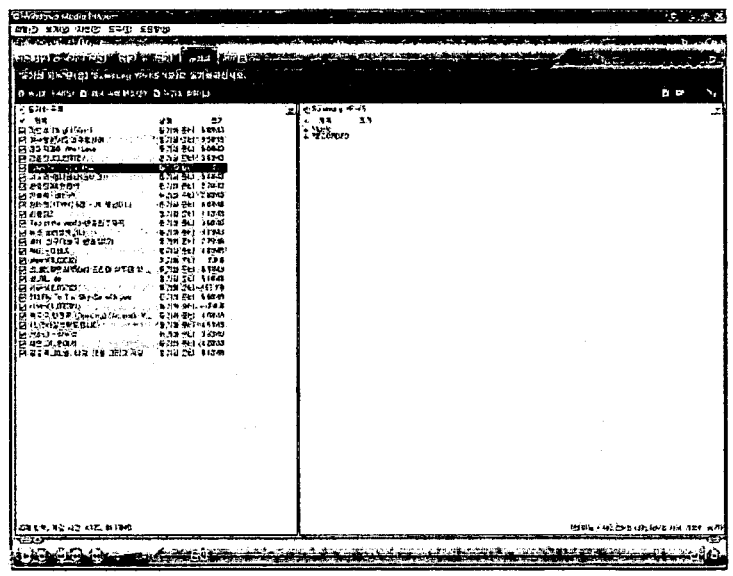
FIG. 2B shows an example of synchronizing files in a playlist with the media in a portable device using the Windows Media Player 10 program.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
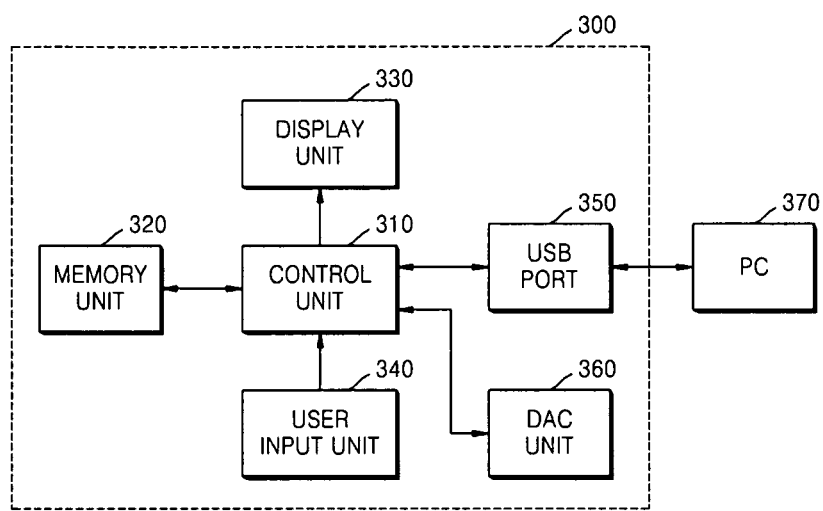
FIG. 3 is a block diagram of a portable device adopting a file management method according to an embodiment of the present invention.

FIG. 3 is a block diagram of a portable device 300 adopting a file management method according to an embodiment of the present invention. First, the portable device 300 is connected to a personal computer (PC) 370, and is disconnected from the PC 370 when a playlist is created. A user creates and/or stores desired music files, folder-by-folder, in the PC 370, and the PC 370 acts as a source server to provide the files to the portable device 300.

Referring to FIG. 3, the portable device 300 includes a control unit 310, a memory unit 320, a display unit 330, a user input unit 340, a universal serial bus (USB) port unit 350, and a digital-analog converter (DAC) unit 360.

The memory unit 320 stores programs to control general operations of the portable device 300 and a program to control the automatic creation of a playlist according to an embodiment of the present invention, and temporarily stores data produced in the course of executing the programs. Specifically, the memory unit 320 includes a file table to store information on files in a unit of a folder, which has been copied from the PC 370, and a playlist table to store file list information.

The user input unit 340 includes keys to allow the user to input numeral and character information, and functional keys to set various functions. However, it is understood that according to other aspects, the user input unit 340 includes other devices and methods to receive inputs from the user, such as a rotatable dial and/or a touch screen.

The display unit 330 displays user interface information output from the control unit 310.

The DAC unit 360 converts audio data, which has been decoded in the control unit 310, into analog audio signals and outputs the analog audio signals to speakers, earphones, and/or an external device.

The USB port 350 complies with the interface standard to connect the portable device 300 to the PC 370. It is understood that according to other aspects, connection devices and methods other than USB are used, such as a Bluetooth unit to connect to the PC via a Bluetooth connection or an infrared unit to connect to the PC via an infrared connection.

The control unit 310 controls general operations of the portable device and/or decodes audio and/or video data stored in the memory 320. Specifically, the control unit 310 copies files that are to be played, folder-by-folder, while connected to the PC 370 through the USB port 350, determines if there are added or deleted files by checking a file system through, for example, a file allocation table (FAT) when the files are completely copied, and creates a playlist of the files copied folder-by-folder according to a change in the file system.

Figure 4:
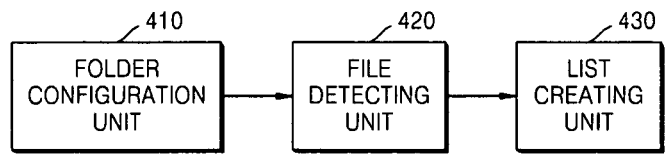
FIG. 4 is a block diagram of a control unit illustrated in FIG. 3.

FIG. 4 is a block diagram of the control unit 310 illustrated in FIG. 3. Referring to FIG. 4, the control unit 310 includes a folder configuration unit 410, a file detecting unit 420, and a list creating unit 430.

The folder configuration unit 410 copies the files that are to be played from the PC 370 through the USB port 350, folder-by-folder, and stores the files in the file system corresponding to the FAT. According to an aspect, information on the files copied in the file system includes an index number, a file path, a physical memory start address, a file size, and table new/old information.

The file detecting unit 420 determines whether there are added or deleted files by checking for changes in the file system.

When the file detecting unit 420 determines that there is an added file, the list creating unit 430 analyzes path information of the file, creates a playlist title, and stores information on the added or deleted file (such as an index number, a file name, and a playlist title) in a playlist table.

Figure 5:
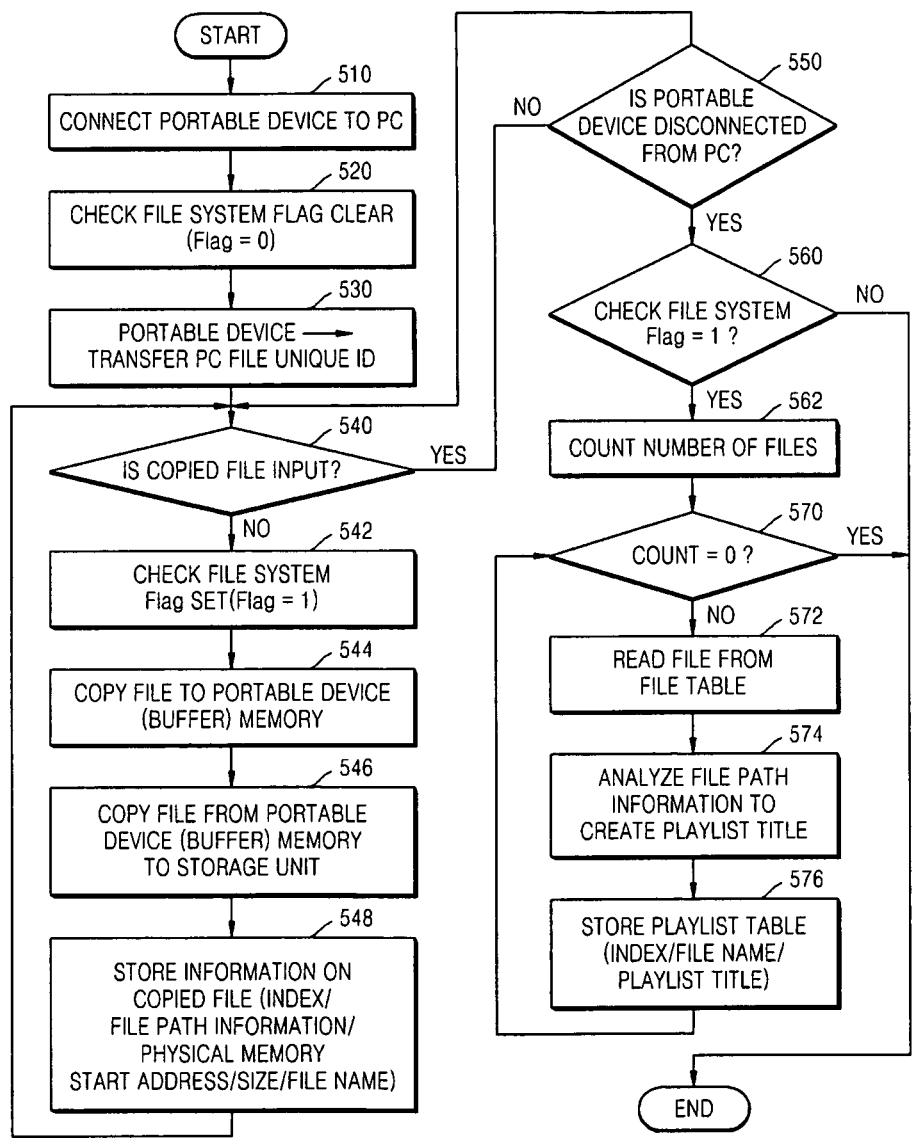
FIG. 5 is a flowchart of a method of managing files of a portable device according to an embodiment of the present invention.

FIG. 5 is a flowchart of a method of managing files of a portable device 300 according to an embodiment of the present invention. First, the portable device 300 is connected to a PC 370 (operation 510). The portable device 300 sets a check flag to 0 in a file system (operation 520). Then, the portable device 300 transmits a unique ID value to the PC 370 according to the media transport protocol (MTP) standard (operation 530). For example, if ID values of files used in the portable device 300 are 1, 2, 3, and 4, an ID value transferred to the PC 370 is 5. This ID value becomes the standard to set the index number of a file inside the PC 370. For instance, the PC 370 sets indices of files as 5, 6, 7, and so on.

Figure 6A:
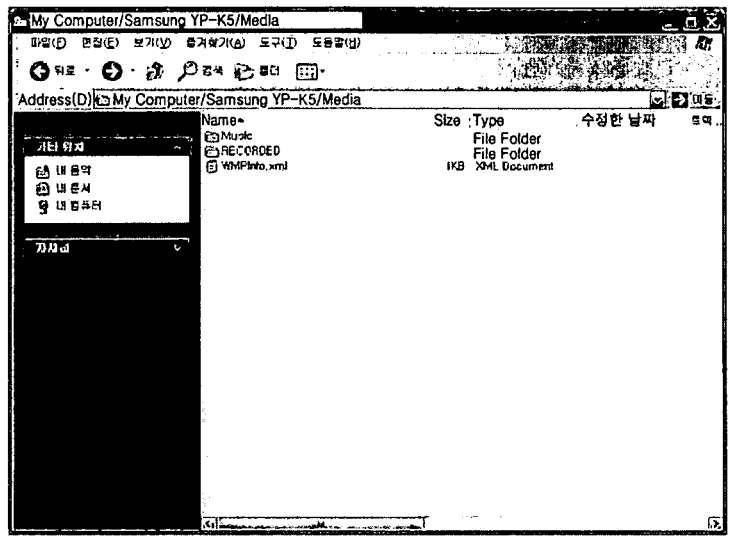
FIGS. 6A and 6B are Windows screens explaining the file management method illustrated in FIG. 5.
Figure 6B:
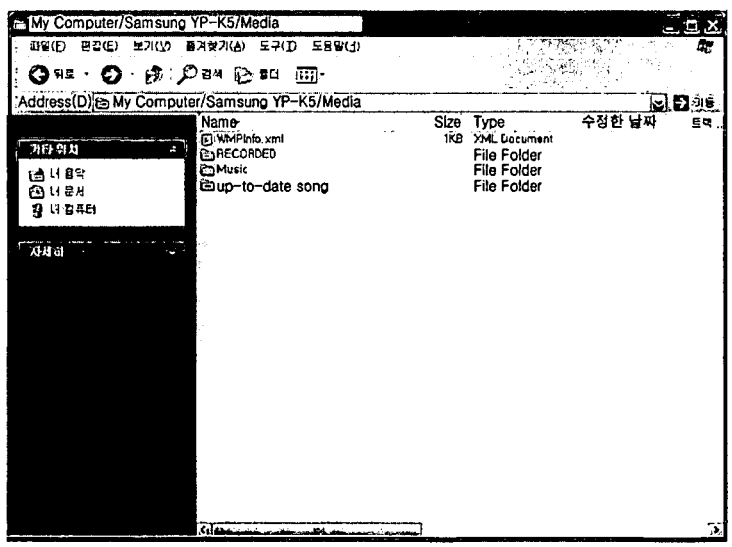

At the same time, a "portable device/media" folder is created in a screen of the PC 370 connected to the portable device 300. The user creates folders including files that he or she desires to be played using a searching program on the PC 370. Next, the user searches folders in the portable device 300 using the searching program, such as the Windows searching program illustrated in FIG. 6A. Then, the user copies the playlist folder-by-folder from the PC 370 to a media folder of the portable device 300, as illustrated in FIG. 6B.

Afterwards, the portable device 300 checks if the files are copied to the portable device 300 using a write enable signal (operation 540). Then, the check flag is set by checking the file system (operation 542).

When the files are input from the PC 370 to the portable device 300 on a folder-by-folder basis, the files are copied to a buffer memory of the portable device 300 (operation 544). Referring to FIG. 6B, in the Windows screen, an "up-to-date-song" folder is copied to the media folder of the portable device. The directories illustrated in FIG. 6B can be displayed as a tree-like structure including folders and dependent files.

Then, the files are copied from the buffer memory to a storage unit in the portable device (operation 546). The storage unit may be, for example, NAND flash memory, NOR flash memory, or a hard disk drive.

Figures 6C, 6D:
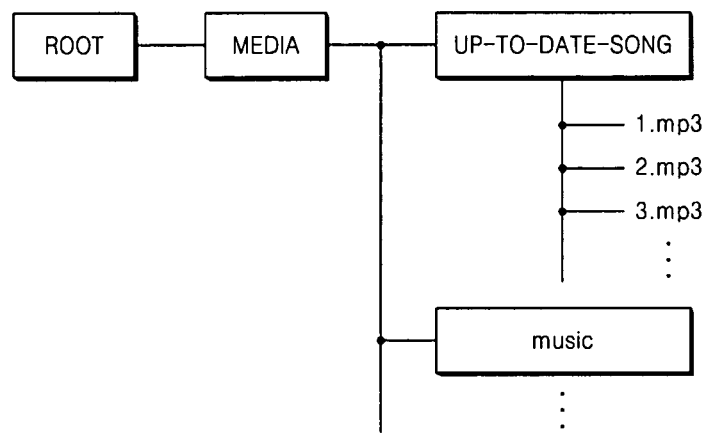

The portable device 300 then stores information on the copied files in, for example, a FAT on a record-by-record basis (operation 548). FIG. 6D shows an example of the FAT storing the file information according to an embodiment of the present invention. An index number, a file path, a physical memory start address, a file size, a file name, and table new/old information of each file in the "up to date song" folder is stored in the FAT. For example, referring to FIGS. 6C and 6D, in the case of "1.mp3", an index number is "1", a file path is "root/media/up-to-date-song", a physical memory start address is "20", a file size is 20 bytes, and table new/old information is "new". The table new/old information indicates if the file is registered from the file table to the playlist table.

When all files to be copied are completely copied, the portable device 300 confirms if the disconnection from the PC 370 is complete (operation 550). When confirming the disconnection from the PC 370, the portable device 300 detects if there are added files which must be registered in the playlist table by checking the file system (operation 560). For example, when the check flag of the file system is set to 1, the portable device 300 determines that added files are present.

With reference to the table new/old information in the FAT, the portable device 300 counts the number of added files (operation 562). For example, if the number of files which have not been registered from the file table to the playlist table is five (that is, the number of files that have a table new/old information entry of "new"), the number of the added files is five. Then, file information of a first file, stored on a record-by-record basis in the FAT corresponding to the file system, is read (operation 572).

File path information of the first file is analyzed, and the last file directory or folder in the file path information of each record-by-record based file is registered in the table as a playlist title (operation 574). For example, the file path of a file (1.mp3) corresponding to an index number 1 is "root/media/up-to-date-song." Therefore, the playlist title is "up-to-date-song," which corresponds to the last folder in the file path. Then, the index number, the file name, and the playlist title of the file are stored in the playlist table, and a playlist table registering of the next added file is performed in the same manner (operation 576).

The operations 572 through 576 are repeated until the file number count becomes "0" (that is, all of the added files are registered in the playlist table). Finally, in the playlist table, file information is stored as illustrated in FIG. 6E. That is, referring to FIG. 6E, the playlist table includes an index number, a file name, and a playlist title of each file.

Aspects of the present invention can be written as computer programs and can be implemented in general-use digital computers that execute the programs using a computer-readable recording media. Examples of the computer-readable recording media include magnetic storage media (e.g., ROM, floppy disks, hard disks, etc.), optical recording media (e.g., CD-ROMs, or DVDs), and storage media such as a computer data signal embodied in a carrier wave including a compression source code segment and an encryption source code segment (e.g., transmission through the Internet). The computer-readable recording medium can also be distributed over network-coupled computer systems so that the computer-readable code is stored and executed in a distributed fashion.

According to an aspect of the present invention, a portable device 300 (such as an mp3 player or a mobile phone) creates a playlist automatically on a folder-by-folder basis without a user having to additionally create a playlist, thereby enabling the user to manage files conveniently.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing files of a portable device, the method comprising:
   copying files to be played from a source server to a file system of the portable device on a folder-by-folder basis while the portable terminal is connected to the source server;
   for each file copied, adding an entry corresponding to the file to a file allocation table stored in the portable device; and
   when the portable terminal is no longer connected to the source server, updating a playlist table stored in a memory of the portable device to reflect the files copied to the file system based on changes made to the file allocation table,
   wherein the updating of the playlist table includes updating the playlist table based on the file path information of the copied files, such that each of the copied files has a playlist title corresponding to a folder in which the copied file is located.

2. The method as claimed in claim 1, wherein the copying of the files to be played comprises:
   copying the files to be played from one or more folders in the source server to a media folder of the portable device, and
   wherein the entries of the file allocation table include file information of the files copied to the file system.

3. The method as claimed in claim 2, wherein the file information stored in the file system comprises an index number, the file path information, a physical memory start address, a file size, and table new/old information.

4. The method as claimed in claim 2, wherein the copying of the files to be played further comprises:
   connecting the portable device to the source server;
   creating the one or more folders in the source server such that the one or more folders include the files to be played; and
   locating the media folder of the portable device.

5. The method as claimed in claim 1, wherein the updating of the playlist table comprises:
   checking for changes in the file system; and
   updating the playlist table when there are the changes in the file system.

6. The method as claimed in claim 5, wherein:
   the copying of the files to be played comprises setting a check file system flag to a set value; and
   the checking for the changes in the file system comprises determining that the check file system flag has the set value.

7. The method as claimed in claim 1, wherein the updating of the playlist table comprises storing the playlist title, an index number, and a file name of each of the copied files in the playlist table.

8. The method as claimed in claim 1, wherein:
   the copying of the files to be played comprises copying one or more first files to a first folder of the file system; and
   wherein the method further comprises creating a first playlist of the one or more first files, such that the first playlist corresponds to the first folder.

9. The method as claimed in claim 8, wherein:
   the copying of the files to be played further comprises copying one or more second files to a second folder of the file system; and
   wherein the method further comprises creating a second playlist of the one or more second files, such that the first playlist corresponds to the first folder and the second playlist corresponds to the second folder.

10. The method as claimed in claim 8, wherein a playlist title of the first playlist corresponds to a last folder in the file path information of the one or more first files.

11. The method as claimed in claim 2, wherein the file information stored in the file system comprises the file path information, indicating a file path of each of the copied files, and table new/old information, indicating whether each of the copied files has a corresponding playlist, of the one or more playlists.

12. The method as claimed in claim 11, wherein the updating of the playlist table comprises:
   reading the file allocation table; and
   storing a playlist title corresponding to the file path information of each of the copied files that does not have the corresponding playlist according to the table new/old information.

13. A portable device comprising:
   a non-volatile memory unit to store file information and playlist information on a folder-by-folder basis;
   an interface port unit to interface with a source server; and
   a control unit to copy files to be played from the source server connected by the interface port unit to a file system of the memory unit, to add an entry to a file allocation table, and to update a playlist table based on the file allocation table on a folder-by-folder basis when the portable terminal is no longer connected to the source server, such that each of the copied files has a playlist title corresponding to a folder in which the copied file is located.

14. The portable device as claimed in claim 13, wherein the control unit comprises:
   a folder configuration unit to copy the files to be played from the source server to the file system; and
   a playlist creating unit to update the playlist table.

15. The portable device as claimed in claim 14, further comprising:
   a file detecting unit to check for changes in the file allocation table, wherein the playlist creating unit updates the playlist table when the file allocation table has changed.

16. The portable device as claimed in claim 15, wherein:
   the folder configuration unit sets a check file system flag to a set value when the folder configuration unit copies the files to be played; and the file detecting unit checks whether the check file system flag has the set value to check for the changes in the file allocation table.

17. The portable device as claimed in claim 13, wherein the playlist table comprises a playlist title and a file name of each of the copied files.

18. The portable device as claimed in claim 13, wherein:
the control unit copies one or more first files to be played to a first folder of the file system; and
the control unit creates a first playlist for the one or more first files, such that the first playlist corresponds to the first folder.

19. The portable device as claimed in claim 18, wherein:
the control unit copies one or more second files to be played to a second folder of the file system; and
the control unit creates a second playlist of the one or more second files, such that the first playlist corresponds to the first folder and the second playlist corresponds to the second folder.

20. The portable device as claimed in claim 18, wherein a playlist title of the first playlist corresponds to a last folder in the file path information of the one or more first files.

21. The portable device as claimed in claim 13, wherein the file allocation table comprises file path information, indicating a file path of each of the copied files, and table new/old information, indicating whether each of the copied files has a corresponding playlist.

22. The portable device as claimed in claim 21, wherein the playlist creating unit reads the file information stored in the file allocation table and updates the playlist table according to the table new/old information.

\* \* \* \* \*